US009668172B2

(12) United States Patent
Randell et al.

(10) Patent No.: US 9,668,172 B2
(45) Date of Patent: May 30, 2017

(54) METHOD AND APPARATUS FOR ENABLING NEAR REAL TIME DATA ANALYSIS

(71) Applicant: Viavi Solutions UK Limited, Berkshire (GB)

(72) Inventors: Nicholas James Randell, Hants (GB); Peter Kenington, Chepstow (GB); Christopher Drawater, Reading (GB)

(73) Assignee: Viavi Solutions UK Limited, Berkshire (GB)

( * ) Notice: Subject to any disclaimer, the term of this patent is extended or adjusted under 35 U.S.C. 154(b) by 39 days.

(21) Appl. No.: 14/103,456

(22) Filed: Dec. 11, 2013

(65) Prior Publication Data

US 2015/0163696 A1 Jun. 11, 2015

(51) Int. Cl.
| | |
|---|---|
| H04W 28/16 | (2009.01) |
| H04W 8/00 | (2009.01) |
| H04L 12/26 | (2006.01) |
| H04L 12/24 | (2006.01) |
| H04W 24/08 | (2009.01) |
| H04W 24/04 | (2009.01) |

(52) U.S. Cl.
CPC ............ *H04W 28/16* (2013.01); *H04L 41/14* (2013.01); *H04L 43/028* (2013.01); *H04L 43/12* (2013.01); *H04W 8/00* (2013.01); *H04W 24/04* (2013.01); *H04W 24/08* (2013.01)

(58) Field of Classification Search
CPC ................................ H04W 4/02; H04W 64/00
USPC ..................................................... 455/456.1
See application file for complete search history.

(56) References Cited

U.S. PATENT DOCUMENTS

| | | | |
|---|---|---|---|
| 5,285,494 A | 2/1994 | Sprecher et al. | |
| 7,362,768 B1 | 4/2008 | Dommety | |
| 2002/0194062 A1* | 12/2002 | Linde | G06Q 30/02 705/14.52 |
| 2006/0221942 A1* | 10/2006 | Fruth | H04M 7/006 370/356 |

(Continued)

FOREIGN PATENT DOCUMENTS

| | | |
|---|---|---|
| CA | 2 578 302 A1 | 1/2007 |
| CA | 2 578 602 A1 | 1/2007 |

(Continued)

OTHER PUBLICATIONS

European Search Report corresponding to EP 14 19 7440, mailed Apr. 23, 2015, 9 pages.

(Continued)

*Primary Examiner* — Vladimir Magloire
*Assistant Examiner* — Ernest Tacsik
(74) *Attorney, Agent, or Firm* — Harrity & Harrity, LLP

(57) ABSTRACT

A method and apparatus for enabling near real time analysis of data for a wireless communication network using dynamic allocation backend processing resources. The method comprises, at each of a plurality of distributed components of a data processing system, receiving data from at least one network element of the cellular communication network, parsing the received data to extract a subset of the received data, and forwarding the extracted subset of data to the dynamic allocation backend processing resources for analytical processing of the extracted subset of data for the wireless communication network.

20 Claims, 3 Drawing Sheets

(56) References Cited

U.S. PATENT DOCUMENTS

| | | |
|---|---|---|
| 2006/0293046 A1* | 12/2006 | Smith .......................... 455/423 |
| 2012/0047107 A1* | 2/2012 | Doddavula ....... G06F 17/30575 707/620 |
| 2012/0110055 A1* | 5/2012 | Van Biljon et al. .......... 709/201 |
| 2012/0157088 A1 | 6/2012 | Gerber et al. |
| 2013/0047230 A1 | 2/2013 | Krishnan et al. |
| 2013/0114454 A1 | 5/2013 | Hwang et al. |
| 2014/0287739 A1 | 9/2014 | Kenington et al. |
| 2014/0287740 A1 | 9/2014 | Kenington et al. |
| 2014/0287741 A1 | 9/2014 | Kenington et al. |
| 2015/0163721 A1 | 6/2015 | Randell et al. |

FOREIGN PATENT DOCUMENTS

| | | |
|---|---|---|
| EP | 2 592 860 A2 | 5/2013 |
| WO | WO 2010/081658 A2 | 7/2010 |

OTHER PUBLICATIONS

European Search Report corresponding to EP 14 19 7456, mailed Jun. 16, 2015, 9 pages.

\* cited by examiner

METHOD AND APPARATUS FOR ENABLING NEAR REAL TIME DATA ANALYSIS

FIELD OF THE INVENTION

The field of the invention relates to a method for enabling near real time data analysis, and in particular to a method and apparatus for enabling near real time analysis of data for a wireless communication network using dynamic allocation backend processing resources.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS™), developed by the $3^{rd}$ Generation Partnership Project (3GPP™) (www.3gpp.org).

The $3^{rd}$ and $4^{th}$ generations of wireless communications, and particular systems such as LTE (Long Term Evolution), have generally been developed to support macro-cell mobile phone communications, and more recently femto-cell mobile phone communications. Here the 'phone' may be a smart phone, or another mobile or portable communication unit that is linked wirelessly to a network through which calls etc. are connected. Henceforth all these devices will be referred to as mobile communication units. Calls may be data, video, or voice calls, or a combination of these. An increasing proportion of communications involve data rather than voice, and are technically referred to as being a 'connection', rather than a 'call'. Nevertheless, the terms 'connection' and 'call' as used herein are to be understood as being interchangeable and each referring to data, video and/or voice calls/connections unless otherwise defined.

Typically, mobile communication units, or User Equipment as they are often referred to in 3G parlance, communicate with a Core Network of the 3G (or 4G) wireless communication system. This communication is via a Radio Network Subsystem. A wireless communication system typically comprises a plurality of Radio Network Subsystems. Each Radio Network Subsystem comprises one or more cells, to which mobile communication units may attach, and thereby connect to the network. A base station may serve a cell. Each base station may have multiple antennas, each of which serves one sector of the cell.

Operators of wireless communication systems need to know what is happening in the system, with as much precision as possible. A particular issue is the need to solve 'faults'. Faults may take a wide variety of forms, but can be summarised as events when the network and/or one or more mobile communication units do not perform as expected.

In most conventional cellular networks, quality of service information is generally reported on a per-cell or per-sector basis. A result of this is that network statistics obtained may only provide an indication of the average data rate or average number of dropped calls, for example, in a given sector or cell. It is not usually possible to obtain network statistics from such conventional quality of service information for a particular portion of a sector or cell that may suffer from poor data rates or dropped calls due, in part, to these particular sectors or cells having poor coverage.

It is known to utilise and compare, in real time, the signatures of mobile communication units to determine location information. These systems are typically located at, for example, switching centres where raw communication session data is stored. Modern wireless communication systems allow a high degree of autonomy to individual mobile communication units and to base stations. As a consequence, decisions about setting up and 'tearing down' call links throughout the network are not all made centrally. As a result, a complication arises from the volume of raw communication session data generated within the wireless communication system. In one day, a wireless communication system may generate 100 gigabytes of data about calls that have been made in the network.

One constraint in particular is the processing requirements for processing the large volumes of raw data in order to obtain meaningful information. With conventional systems, which are typically located at, for example, switching centres where raw communication session data is stored, significant processing resources are required to be provided at each such location (e.g. at each switching centre) for processing the 'local' data stored at the respective location.

Such a distribution of processing resources across multiple locations within a network, with the processing resources at each location being dedicated to the processing of local data, is an inefficient use of such processing resources since often the processing resources at many of the locations may not be fully utilised. Furthermore, if the processing requirements at a particular location are increased, for example due to an increase in network capacity corresponding to that location, the processing capacity at that location may be exceeded even if only by a small amount. As a result, additional processing hardware may need to be sourced. Such a small additional processing requirement could require replacement or additional sets of processing cards, racks or storage to be implemented. In this case, a relatively large capital outlay may be required by the network operator to provide for a relatively small increase in required processing capacity at a single site. Furthermore, such an increase in required processing capacity may only be needed for a small proportion of the time, for example for short durations each, say, day or week at 'peak' times on a network. As a result, such localised processing of data does not scale well and requires significant localised upfront hardware costs which may only be necessary to satisfy a small increase in capacity occurring for a small proportion of the time each day/week.

A conventional approach to improve efficiency in mass processing systems is to provide the data to be processed to one or more centralised or shared processing resources. For example, data from distributed sites (e.g. the switching centres of a wireless communication system) may be provided to centralised processing resources or to one or more shared (e.g. cloud) processing resources. In this manner, more efficient processing of data from multiple distributed sites may be performed.

An important requirement for the Applicant's data processing system is that users are able to access analytical data in near real time. For example, analytical data relating to an event is available to users within a relatively short period of time, for example within, say, a period of minutes of the data being made available from the radio network controller (RNC), in a 3G (or 4G) wireless communication system. It is worth noting that in a conventional 3G/4G wireless communication system, data relating to recent calls is made available by RNCs in batches, for example comprising 15 minutes worth of call data. As such, data may be made available by an RNC approximately every 15 minutes, with a potential 15 minute latency for some of the call data between the respective event and the data being made available by the RNC. Because of this inherent 15 minute latency between an event occurring and the data being made available by the RNC, it is even more important to minimise any further delay between the data being made available by the RNC and the data being available to users.

This is in contrast to conventional data processing systems which perform 'batch processing' whereby communication session data is processed off-line, and there is a delay of many hours typically between an event of interest taking place and the resulting analytical data being available to users.

In order to enable such near real time access of analytical data, the large volume of raw communication session data continuously being generated within the wireless communication network must be processed substantially as it is made available from the RNCs (or as soon as possible afterwards). A problem with the conventional use of centralised processing and/or shared processing is that such a large volume of communication session data would require a very high speed (and very expensive) communications link in order to transport the data from each of the distributed sites to one or more 'backend' data-centres for processing, which will typically be located hundreds or thousands of miles away and may even be on a different continent. The requirement for such an expensive communications link between each of the distributed sites and one or more backend data centres makes the conventional use of centralised processing and/or shared processing prohibitively expensive, and is a particular problem when using dynamic allocation processing systems such as cloud processing systems that typically comprise generic (often shared) processing systems which autonomously allocate resources (both the geographic location of the resources and the timing of their usage) using a process which may not be under the control of the data provider or the ultimate user. As such, the communication of data to such cloud processing systems is required to be more flexible and adaptive, further increasing the potential costs of such communication links.

SUMMARY OF THE INVENTION

Accordingly, the invention seeks to mitigate, alleviate or eliminate one or more of the abovementioned disadvantages singly or in any combination. According to a first aspect of the present invention, there is provided a method of enabling near real time analysis of data for a wireless communication network using dynamic allocation backend processing resources. The method comprises, at each of a plurality of distributed components of a data processing system, receiving data from at least one network element of the cellular communication network, parsing the received data to extract a subset of the received data, and forwarding the extracted subset of data to the dynamic allocation backend processing resources for analytical processing of the extracted subset of data for the wireless communication network.

In this manner, by extracting a subset of the received data for forwarding to the backend processing resources, the amount of data being transported from the distributed components to the backend processing resources, and thus the speed/size of the required communications links there between, may be significantly reduced.

According to a second aspect of the present invention, there is provided a data processing system for enabling near real time analysis of data for a wireless communication network using dynamic allocation backend processing resources. The data processing system comprises a plurality of distributed components arranged to implement the method of the first aspect of the present invention.

According to a third aspect of the present invention, there is provided a distributed component of a data processing system for enabling near real time analysis of data for a wireless communication network using dynamic allocation backend processing resources; the distributed component of the data processing system being arranged to implement the method of the first aspect of the present invention.

According to a fourth aspect of the present invention, there is provided a non-transitory computer program product having computer-readable code stored thereon for programming a data processing module to perform the method of the first aspect of the present invention.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

Figure 1:
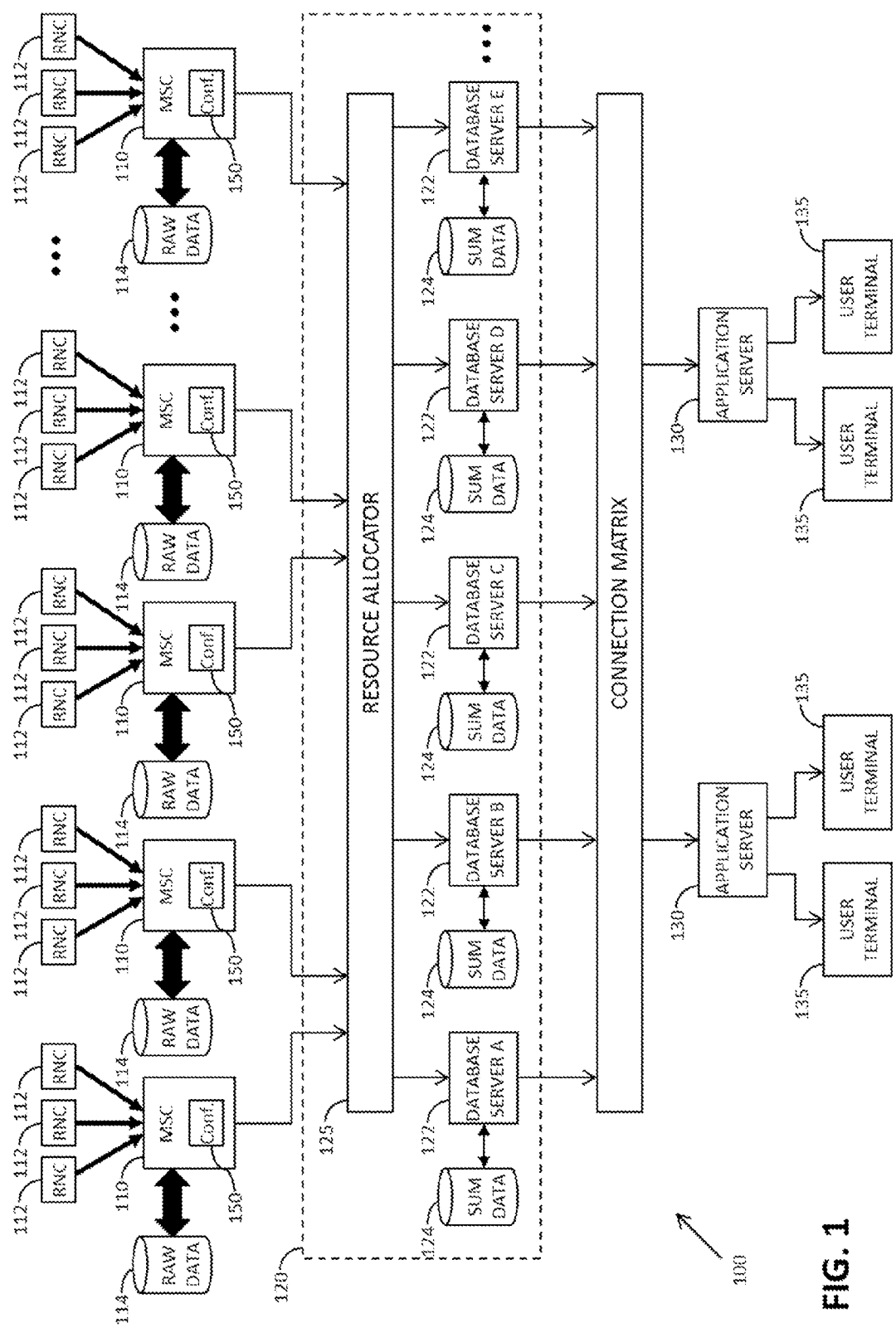
FIG. 1 illustrates a simplified block diagram of an example of a data processing system.

Examples of the invention will be described in terms of a system and a method for generating analytical data for a wireless communication network, such as a network implemented in accordance with the $3^{rd}$ Generation (3G) and/or 4th Generation (4G) of mobile telephone standards and technology. Examples of such 3G and 4G standards and technology are the Universal Mobile Telecommunications System (UMTS™) and Long Term Evolution (LTE), developed by the $3^{rd}$ Generation Partnership Project (3GPP™) (www.3gpp.org).

According to an example of a first aspect of the present invention there is provided a method of enabling near real time analysis of data for a wireless communication network using dynamic allocation backend processing resources. The method comprises, at each of a plurality of distributed components of a data processing system, receiving data from at least one network element of the cellular communication network, parsing the received data to extract a subset of the received data, and forwarding the extracted subset of data to the dynamic allocation backend processing resources for analytical processing of the extracted subset of data for the wireless communication network.

In some optional embodiments, the data received at the plurality of distributed components of the data processing system may comprise raw communication session data for all communication sessions of the respective network elements.

In some optional embodiments, the method may further comprise, at the plurality of distributed components of the data processing system, storing the data received from the at least one network element of the cellular communication network.

In some optional embodiments, the subset of the received data extracted and forwarded to the dynamic allocation backend processing resources may comprise a subset of communication session data received for each communication session of the respective network elements.

In some optional embodiments, the same subset of received data may be extracted and forwarded to the dynamic allocation backend processing resources for each communication session of the respective network element.

In some optional embodiments, the subset of the received data extracted and forwarded to the dynamic allocation backend processing resources may comprise at least one of:
  session connection setup information;
    session closedown information;
    identification of radio links involved in session;
    measured radio propagation delay;
    radio bearer or bearers involved during session;
    type of session;
    measurement reports;
    received signal code power; and
    subscriber information.

In some optional embodiments, the method may further comprise, at the dynamic allocation backend processing resources, allocating the received extracted subset of data to at least one processing resource, pre-processing the received extracted subset of data to enable efficient storage and access of the received extracted subset of data, and storing the pre-processed data for subsequent near real time analysis.

In some optional embodiments, the method may further comprise, at the dynamic allocation backend processing resources, performing near-real-time access of the stored, pre-processed data in response to queries from client applications.

In some optional embodiments, the method may comprise forwarding the extracted subset of data to at least one resource allocator component for allocation to backend processing resources.

In some optional embodiments, the method may comprise forwarding the extracted subset of data to dynamic allocation backend processing resources comprising at least one of:
  public dynamic allocation processing resources;
  private dynamic allocation processing resources;
  community dynamic allocation processing resources; and
  hybrid dynamic allocation processing resources.

In some optional embodiments, the method may comprise forwarding the extracted subset of data to dynamic allocation backend processing resources comprising at least one of at least one shared processing resource, and at least one centralised processing resource.

In some optional embodiments, the dynamic allocation backend processing resources may comprise cloud processing resources.

In some optional embodiments, the method may comprise, upon receipt of at each of a plurality of distributed components of a data processing system, receiving data from at least one network element of the cellular communication network, determining configured data elements to be extracted from received data, parsing the received data to extract the configured data elements therefrom, and forwarding the extracted data elements to dynamic allocation backend processing resources for analytical processing of the extracted data elements.

In some optional embodiments, the method may comprise calculating geolocation information for the received data, and forwarding the geolocation information along with the extracted subset of data to the dynamic allocation backend processing resources.

Referring first to FIG. 1, there is illustrated a simplified block diagram of an example of a data processing system 100 such as may be used for generating, storing and subsequent access of analytical data for one or more wireless communication networks. The various components within the data processing system 100 may be implemented in any suitable manner. For example, the various components of the data processing system 100 may be implemented by way of computer program code, and arranged to be executed on one or more data processing modules. The computer program code may be stored within one or more non-transitory computer program products, for example such as one or more memory element(s). Such memory element(s) may comprise any form of computer-readable storage device, such as a hard disc, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

The data processing system 100 comprises a plurality of distributed components 110, each distributed component 110 arranged to receive data from one or more network elements 112. In the example illustrated in FIG. 1, the distributed components 110 comprise mobile switching centres (MSCs), which are arranged to receive data from radio network controllers (RNCs) 112. In a 3G system, the RNCs 112 are typically located at their respective MSC 110. In some examples, the data received by the distributed components 110 comprises raw communication session data, such as 'layer 3' data in the context of a 3G wireless communication system, for all communication sessions of the respective network elements 112, and each of the distributed components 110 may be arranged to store the raw communication session data, for example within local data storage devices 114. In this manner, all raw communication session data may be stored, at least for a period of time, and available should it be required to be subsequently accessed.

The data processing system 100 further comprises backend processing resources, indicated generally at 120. In the illustrated example, the backend processing resources comprise a plurality of database servers 122 arranged to receive data from the distributed components 110 and perform, for example, preprocessing of the received data to enable efficient storage and access of the received data. In the illustrated example, each database server 122 is operably coupled to one or more data storage devices 124 in which the pre-processed data may be stored for subsequent access by users. In particular, the backend processing resources 120 are arranged to enable near-real-time access of the stored, pre-processed data in response to queries from client applications. As such, in the illustrated example the backend processing resources 120 are operably coupled to one or more client servers 130 through which users operating user terminals 135 are able to access data stored within data storage devices 124. Examples of some of the contemplated functionality of the database server 122 are described in the Applicant's co-pending US patent applications: U.S. Patent Application Publication No. 2014/0287739; U.S. Patent Application Publication No. 2014/0287740; and U.S. Patent Application Publication No. 2014/0287741, which are herein incorporated by reference.

The backend processing resources may be realized in any suitable architecture and/or implementation. In the illustrated example, the backend resources are implemented by way of a dynamic allocation processing system, and (at least partly) comprise one or more dynamically allocated processing resources whereby the backend processing resources may be shared with various other systems, with processing resources being allocated to different systems as required. In some examples of the present invention, the dynamic allocation processing system may be implemented by way of a cloud processing system.

For clarity, the term 'dynamic allocation processing system' as used herein, with the term 'dynamic allocation processing resources' being interpreted accordingly, refers to a processing system comprising one or more physical processing hardware elements, each of which may provide one or multiple virtual processing 'machine(s)'. Dynamic allocation processing systems, such as processing systems often referred to as cloud processing systems, are typically based upon high-volume, commodity, computer hardware (as opposed to dedicated, purpose designed or configured machines).

In a dynamic allocation processing system, incoming processing tasks are allocated by hardware or software under the control of the dynamic allocation processing system, and not the person/organisation/device submitting the processing task. The source of the processing task does not typically know on which physical machine or machines the task will be processed, and the allocation of tasks from particular sources to a physical machine or machines may change with time.

A dynamic allocation processing system will typically support a number of different processing tasks, potentially from a number of different customers/clients, running simultaneously, with the distribution of the available resources being allocated flexibly or 'elastically' to different customers/clients at different times.

The location of physical processing devices within the dynamic allocation processing system may be geographically distributed, with tasks from the same source, submitted at the same time, being executed in any one or more of a number of different geographic locations, depending upon the available resources (or some other criterion).

A dynamic allocation processing system may be a public system (where the services are open for public use), a private system (where the system is operated solely for a single organization, whether managed internally or by a third-party and hosted internally or externally), a community system (where the system is shared between several organizations from a specific community with common concerns, whether managed internally or by a third-party and hosted internally or externally), or a hybrid of the above systems.

The use of such dynamic allocation processing systems provides benefits such as:
  Rapid elasticity. Capabilities can be elastically provisioned and released, in some cases automatically, to scale rapidly outward and inward commensurate with demand. To the user, the capabilities available for provisioning often appear unlimited and can be appropriated in any quantity at any time; and
  Resource pooling. The provider's computing resources may be pooled to serve multiple users using a multi-tenant model, with different physical and virtual resources dynamically assigned and reassigned according to user demand.

As previously mentioned, a large volume of raw communication session data is generated within the wireless communication network. By utilising centralised and/or shared dynamic allocation backend processing resources in this manner, the data may be processed and accessed in a significantly more efficient manner than if the processing etc. was performed locally at each of the individual distributed components (i.e. the MSCs 110 in the illustrated example).

However, in order to enable near real time access of analytical data for the wireless communication data, which data is continuously being generated within the wireless communication network, the data must be processed substantially as it is generated (or as soon as possible afterwards). Providing the large volume of raw communication session data generated within the wireless communication network to the dynamic allocation backend processing resources would require a very high speed (and very expensive) communications link in order to transport the data from each of the distributed sites to, in the illustrated example, one or more resource allocator component(s) 125 of the dynamic allocation backend processing resources for allocation to the backend database servers 122 for processing, which may be located hundreds or thousands of miles away and may even be on a different continent. The requirement for such an expensive communications link between each of the distributed sites and one or more resource allocator component(s) makes the conventional use of centralised and/or shared dynamic allocation processing prohibitively expensive.

To overcome this problem of the requirement for prohibitively expensive communications links, the distributed components (i.e. the MSCs 110 illustrated in FIG. 1) are arranged to parse the data received from the RNCs 112 to extract a subset of the received data, for example only comprising data required for predetermined analysis of the communication session data, and to forward the extracted subset of data to the dynamic allocation backend processing resources 120. Advantageously, by parsing the raw communication session data at the distributed components to extract a subset of the data for forwarding to the backend processing resources, the amount of data being transported from the distributed components to the backend processing resources, and thus the speed/size of the required communications links there between, may be significantly reduced.

Figure 2:
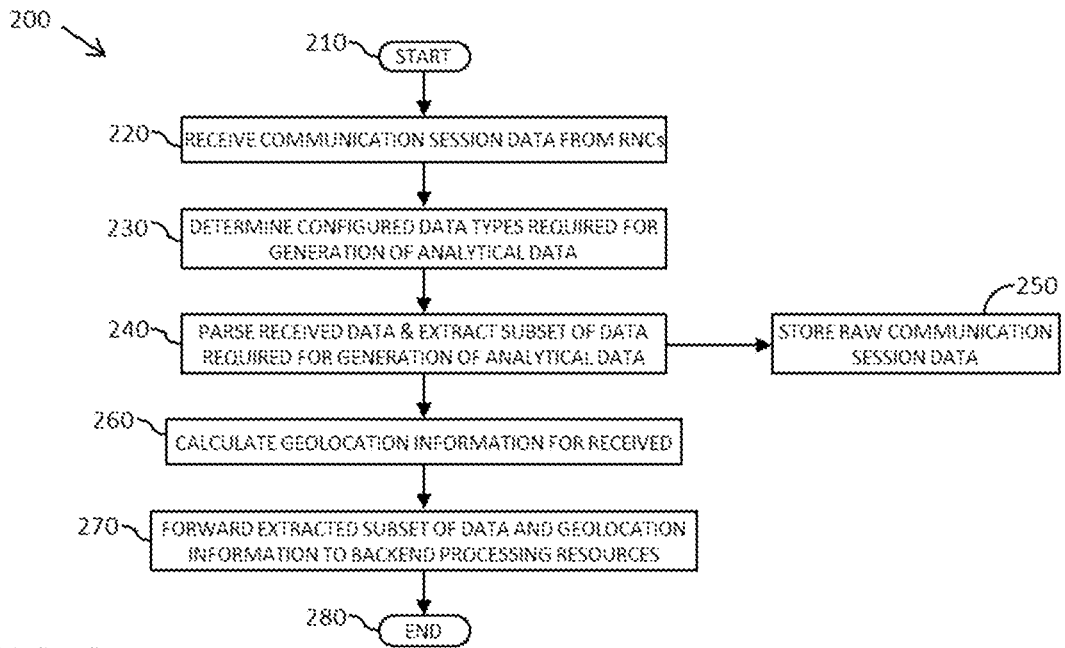
FIGS. 2 and 3 illustrate simplified flowcharts of an example of a method of enabling near real time analysis of data for a wireless communication network.
Figure 3:
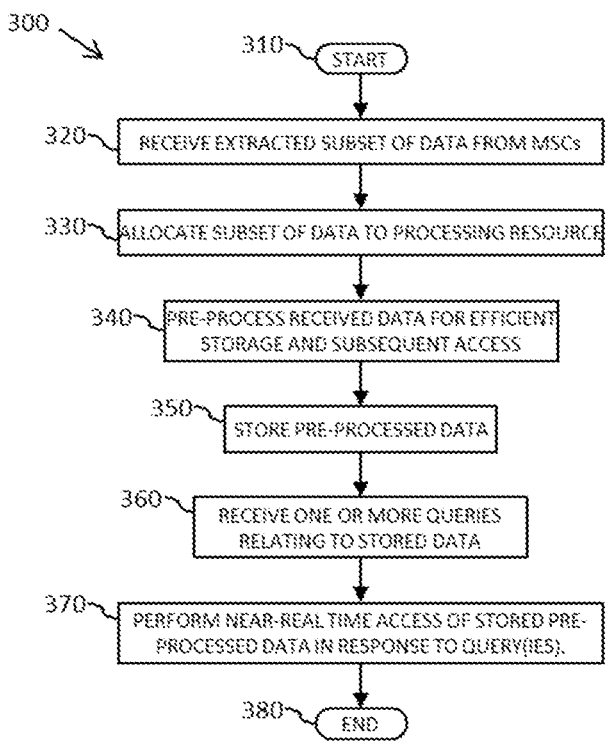

FIGS. 2 and 3 illustrate simplified flowcharts 200, 300 of an example of a method of enabling near real time analysis of data for a wireless communication network, such as may be implemented across distributed components and backend processing resources of a data processing system, such as the data processing system 100 illustrated in FIG. 1.

Referring first to FIG. 2, there is illustrated a first part of the method such as may be implemented within distributed components of a data processing system, such as the MSCs 110 of the data processing system 100 of FIG. 1. The method starts at 210 and moves on to 220 with the receipt of communication session data from network elements such as the RNCs 112 of FIG. 1. It is contemplated that the data received at the distributed components 110 may comprise raw communication session data for all communication sessions of the respective network elements 112.

In the illustrated example, required data elements for the generation of analytical data are then determined, at 220. Such data elements may be configured by, say, a network operator depending on the typical data elements required for generating the desired analytical data for the wireless communication network. For example, data elements may be configured within one or more configurable memory elements with each of the MSCs, as illustrated generally at 150. Furthermore, it is contemplated that such data elements may be reconfigured as required by the network operator, thereby enabling configurability and flexibility to be provided within the data processing system 100.

Having determined the configured data elements required for generation of analytical data, the method moves on to 240 where the received communication session data is parsed to extract a subset of data in accordance with the determined configured data elements. That is to say, a subset of the received data corresponding to the determined configured data elements is extracted. It is contemplated that the subset of the received data extracted may comprise a subset of communication session data received for each communication session of the respective network elements 112. Furthermore, it is contemplated that substantially the same subset of the received data may be extracted for each communication session. In this manner, the subset of information extracted need not correspond only to 'problem' calls or events, but may relate to all calls or events for each communication session.

In the illustrated example, geolocation information is then calculated for the received data, for example from the extracted subset of data. The geolocation information for a particular data segment will typically be at a finer resolution than just an identification of the cell or sector in which the communication session to which that data segment corresponds took place. A variety of algorithms may be used to calculate the geolocation information, and these provide varying precision and accuracy. Examples of such algorithms may include, say, algorithms that use round-trip delay (RTD) calculations/measurements for signals between mobile communication units and basestations, algorithms that use signal strength measurements received from mobile communication units, etc.

The extracted subset of data, along with the geolocation information in the illustrated example, is then forwarded to the backend processing resources for analytical processing, at 270. In the example illustrated in FIG. 1, the extracted subset of data is forwarded to the allocator component(s) 125 of the dynamic allocation backend processing resources 120, which allocates the data to backend database servers 122 for analytical processing. These backend database servers 122 could be one or more physical machines or could be virtual machines running on one or more physical machines.

In the illustrated example, the 'raw' received communication session data is then stored, for example within the local data storage devices 114. In this manner, the raw data may be retained locally at the distributed components 110, from where more detailed information may be retrieved if subsequently desired. This part of the method then ends at 280.

Typically, all distributed components 110 will be configured with the same data elements required for the generation of analytical data, and thus will typically extract the same 'type' of data to be forwarded to the backend processing resources. However, it is contemplated that different data elements may equally be configured for different distributed components 110 if required/desired by, say, the network operator. In this manner, the type of data forwarded to the backend processing resources and/or the quantity of data may be individually configured for the different distributed components 110 if required/desired.

Examples of data elements that may be configured to be extracted from received data and forwarded to the backend processing resources comprise:
   session connection setup information;
      session closedown information;
      identification of radio links involved in session;
      measured radio propagation delay;
      radio bearer or bearers involved during session;
      type of session;
      measurement reports;
      received signal code power; and
      subscriber information.

Referring now to FIG. 3, there is illustrated a further part of the method such as may be implemented within one or more dynamically allocated backend processing resources of a data processing system, such as the database servers 122 of the data processing system 100 of FIG. 1. The method starts at 310 and moves on to 320 with the receipt of a dynamically allocated, extracted subset of data from one or more distributed components 110. The received extracted subset of data is then dynamically allocated to processing resources at 330, which in the example illustrated in FIG. 1 comprises the resource allocator component 125 allocating the received data to the database servers 122. In the illustrated example, the data is then pre-processed to enable efficient storage and access of the received extracted subset of data at 340, and the pre-processed data is then stored, at 350. Such pre-processing may comprise an extract, transform and load (ETL) operation on the data, resulting in the creation of a 'summary database'. Examples of the preprocessing that may be performed on the received data are described in the Applicant's co-pending US patent applications: U.S. Patent Application Publication No. 2014/0287739; U.S. Patent Application Publication No. 2014/0287740; and U.S. Patent Application Publication No. 2014/0287741, all of which are incorporated by reference herein.

Upon subsequent receipt of one or more queries relating to the stored (pre-processed) data, as illustrated at 360, near-real time access of the stored and pre-processed data may be performed in response to the received query(ies), at 370. In the example illustrated in FIG. 1, such queries may be generated by the application servers 130, which may format and present the data returned in response to the queries in the form of, for example, maps, graphs, charts etc. or any other suitable format, as required by the users. The method then ends at 380.

Figure 4:
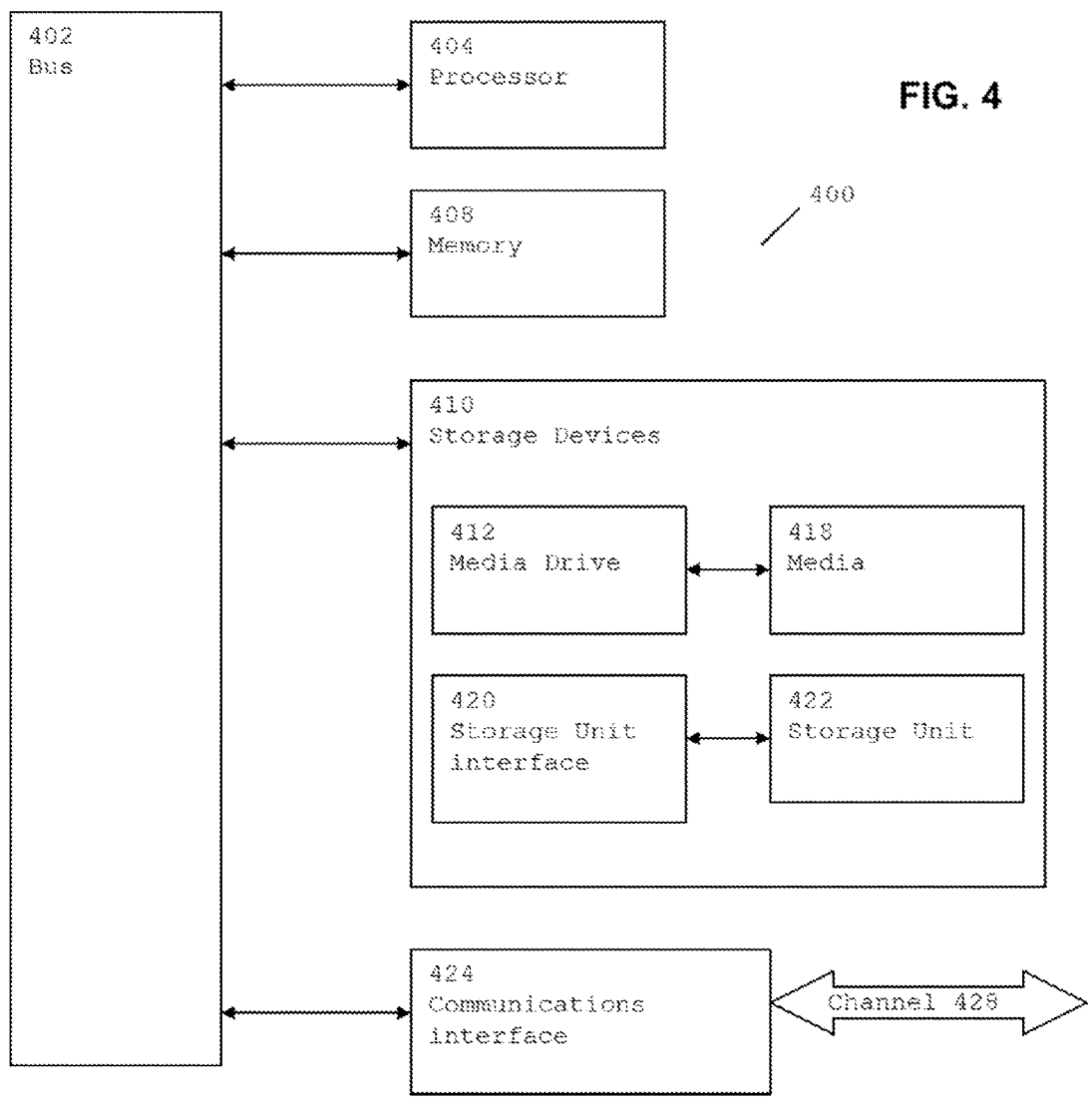
FIG. 4 illustrates a typical computing system that may be employed to implement data processing functionality in embodiments of the invention.

Referring now to FIG. 4, there is illustrated a typical computing system 400 that may be employed to implement data processing functionality in embodiments of the invention. For example, a computing system of this type may be used within one or more of the MSCs 110, and/or backend processing resources 120 of FIG. 1. Those skilled in the relevant art will also recognize how to implement the invention using other computer systems or architectures. Computing system 400 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 400 can include one or more processors, such as a processor 404. Processor 404 can be implemented using a general or special-purpose processing engine such as, for example, a microprocessor, microcontroller or other control module. In this example, processor 404 is connected to a bus 402 or other communications medium.

Computing system 400 can also include a main memory 408, such as random access memory (RAM) or other dynamic memory, for storing information and instructions to be executed by processor 404. Main memory 408 also may be used for storing temporary variables or other intermediate information during execution of instructions to be executed by processor 404. Computing system 400 may likewise include a read only memory (ROM) or other static storage device coupled to bus 402 for storing static information and instructions for processor 404.

The computing system 400 may also include information storage system 410, which may include, for example, a media drive 412 and a removable storage interface 420. The media drive 412 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 418 may include, for example, a hard disk, floppy disk, magnetic tape, optical disk, CD or DVD, or other fixed or removable medium that is read by and written to by media drive 412. As these examples illustrate, the storage media 418 may include a computer-readable storage medium having particular computer software or data stored therein.

In alternative embodiments, information storage system 410 may include other similar components for allowing computer programs or other instructions or data to be loaded into computing system 400. Such components may include, for example, a removable storage unit 422 and an interface 420, such as a program cartridge and cartridge interface, a removable memory (for example, a flash memory or other removable memory module) and memory slot, and other removable storage units 422 and interfaces 420 that allow software and data to be transferred from the removable storage unit 418 to computing system 400.

Computing system 400 can also include a communications interface 424. Communications interface 424 can be used to allow software and data to be transferred between computing system 400 and external devices. Examples of communications interface 424 can include a modem, a network interface (such as an Ethernet or other NIC card), a communications port (such as for example, a universal serial bus (USB) port), a PCMCIA slot and card, etc. Software and data transferred via communications interface 424 are in the form of signals which can be electronic, electromagnetic, and optical or other signals capable of being received by communications interface 424. These signals are provided to communications interface 424 via a channel 428. This channel 428 may carry signals and may be implemented using a wireless medium, wire or cable, fibre optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 408, storage device 418, or storage unit 422. These and other forms of computer-readable media may store one or more instructions for use by processor 404, to cause the processor to perform specified operations. Such instructions, generally referred to as 'computer program code' (which may be grouped in the form of computer programs or other groupings), when executed, enable the computing system 400 to perform functions of embodiments of the present invention. Note that the code may directly cause the processor to perform specified operations, be compiled to do so, and/or be combined with other software, hardware, and/or firmware elements (e.g. libraries for performing standard functions) to do so.

As used herein, the expression non-transitory will be understood to refer to the non-ephemeral nature of the storage medium itself rather than to a notion of how long the stored information itself may persist in a stored state. Accordingly, memories that might otherwise be viewed, for example, as being volatile (such as many electronically-erasable programmable read-only memories (EPROM's) or random-access memories (RAM's)) are nevertheless to be viewed here as being "non-transitory" whereas a signal carrier in transit is to be considered "transitory" notwithstanding that the signal may remain in transit for a lengthy period of time.

In an embodiment where the elements are implemented using software, the software may be stored in a computer-readable medium and loaded into computing system 400 using, for example, removable storage drive 422, drive 412 or communications interface 424. The control module (in this example, software instructions or computer program code), when executed by the processor 404, causes the processor 404 to perform the functions of the invention as described herein.

Furthermore, the inventive concept can be applied to any signal processing circuit. It is further envisaged that, for example, a semiconductor manufacturer may employ the inventive concept in a design of a stand-alone device, such as a microcontroller, digital signal processor, or application-specific integrated circuit (ASIC) and/or any other subsystem element.

It will be appreciated that, for clarity purposes, the above description has described embodiments of the invention with reference to different functional units and processors. However, it will be apparent that any suitable distribution of functionality between different functional units or processors may be used without detracting from the invention. For example, functionality illustrated to be performed by the same processor or controller may be performed by separate processors or controllers. Hence, references to specific functional units are only to be seen as references to suitable means for providing the described functionality, rather than indicative of a strict logical or physical structure or organization.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

In the foregoing specification, the invention has been described with reference to specific examples of embodiments of the invention. It will, however, be evident that various modifications and changes may be made therein without departing from the broader spirit and scope of the invention as set forth in the appended claims. Other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

We claim:

1. A method comprising:
   receiving, by a device, data from at least one network element of a cellular communication network;
   identifying, in near-real time of receiving the data and by the device, at least one data element that is required to generate desired analytical data based on analyzing a plurality of data elements included in the data;
   parsing, in near-real time and by the device, the data to extract a subset of the data,
      the subset of the data being based on the identified at least one data element,
      the subset of the data including at least one of:
         information associated with a measured radio propagation delay, or
         information associated with a received signal code power;
   determining, in near-real time and by the device, geolocation information based on at least one of the information associated with the measured radio propagation delay or the information associated with the received signal code power included in the subset of the data; and
   forwarding, in near-real time and by the device, the subset of the data and the geolocation information to processing resources for near-real time analytical processing of the subset of the data using the geolocation information,
      the processing resources including at least one of:
         public dynamic allocation processing resources,
         private dynamic allocation processing resources,
         community dynamic allocation processing resources,
         hybrid dynamic allocation processing resources,
         a shared processing resource, or
         a centralized processing resource, and
      the processing resources being included in a group of dynamically allocated processing resources,
         the group of dynamically allocated processing resources being scaled, based on a demand for resources,
         the subset of the data and the geolocation information being pre-processed to create pre-processed data, and
         the pre-processed data being used to generate a response to a query for information associated with at least some of the pre-processed data.

2. The method of claim 1, where the data includes all raw communication session data for all communication sessions of the at least one network element.

3. The method of claim 1, where the subset of the data and the geolocation information are stored.

4. The method of claim 1, where
   the subset of the data is allocated to at least one processing resource of the processing resources, and
   the pre-processed data is stored for subsequent near-real-time analysis.

5. The method of claim 4, where the near-real-time analysis is performed based on a request from a client application.

6. The method of claim 1, where the processing resources include cloud processing resources.

7. A system comprising:
   one or more devices to:
      receive data from at least one network element of a cellular communication network;
      identify, in near-real time, at least one data element that is required to generate desired analytical data based on analyzing a plurality of data elements included in the data;
      parse, in near-real time, the data to extract a subset of the data,
         the subset of the data being based on the identified at least one data element,
         the subset of the data including at least one of:
            information associated with a measured radio propagation delay, or
            information associated with a received signal code power;
      determine, in near-real time, geolocation information based on at least one of the information associated with the measured radio propagation delay or the information associated with the received signal code power included in the subset of the data; and
      forward, in near-real time, the subset of the data and the geolocation information to processing resources for near-real time analytical processing of the subset of the data using the geolocation information,
         the processing resources including at least one of:
            public dynamic allocation processing resources,
            private dynamic allocation processing resources,
            community dynamic allocation processing resources,
            hybrid dynamic allocation processing resources,
            a shared processing resource, or
            a centralized processing resource, and
         the processing resources being included in a group of dynamically allocated processing resources,
            the group of dynamically allocated processing resources being scaled, based on a demand for resources,
            the subset of the data and the geolocation information being pre-processed to create pre-processed data, and
            the pre-processed data being used to generate a response to a query for information associated with at least some of the pre-processed data.

8. A device comprising:
   a memory to store instructions; and
   a processor to execute the instructions to:
      receive data from at least one network element of a cellular communication network;
      identify, in near-real time, at least one data element that is required to generate desired analytical data based on analyzing a plurality of data elements included in the data;
      parse, in near-real time, the data to extract a subset of the data,
         the subset of the data being based on the identified at least one data element,
         the subset of the data including at least one of:
            information associated with a measured radio propagation delay, or
            information associated with a received signal code power;
      determine, in near-real time, geolocation information based on at least one of the information associated with the measured radio propagation delay or the information associated with the received signal code power included in the subset of the data; and forward, in near-real time, the subset of the data to processing resources for near-real time analytical processing of the subset of the data using the geolocation information,
the processing resources including at least one of:
public dynamic allocation processing resources,
private dynamic allocation processing resources,
community dynamic allocation processing resources,
hybrid dynamic allocation processing resources,
a shared processing resource, or
a centralized processing resource, and
the processing resources being included in a group of dynamically allocated processing resources,
the group of dynamically allocated processing resources being scaled, based on a demand for resources,
the subset of the data and the geolocation information being pre-processed to create pre-processed data, and
the pre-processed data being used to generate a response to a query for information associated with at least some of the pre-processed data.

9. A non-transitory computer-readable medium storing instructions, the instructions comprising:
one or more instructions which, when executed by a processor of a device, cause the processor to:
receive data from at least one network element of a cellular communication network;
identify, in near-real time, at least one data element that is required to generate desired analytical data based on analyzing a plurality of data elements included in the data;
parse, in near-real time, the data to extract a subset of the data,
the subset of the data being based on the identified at least one data element,
the subset of the data including at least one of:
information associated with a measured radio propagation delay, or
information associated with a received signal code power;
determine, in near-real time, geolocation information based on at least one of the information associated with the measured radio propagation delay or the information associated with the received signal code power included in the subset of the data; and
forward, in near-real time, the subset of the data to processing resources for near-real time analytical processing of the subset of the data using the geolocation information,
the processing resources including at least one of:
public dynamic allocation processing resources,
private dynamic allocation processing resources,
community dynamic allocation processing resources,
hybrid dynamic allocation processing resources,
a shared processing resource, or
a centralized processing resource, and
the processing resources being included in a group of dynamically allocated processing resources,
the group of dynamically allocated processing resources being scaled, based on a demand for resources,
the subset of the data and the geolocation information being pre-processed to create pre-processed data, and
the pre-processed data being used to generate a response to a query for information associated with at least some of the pre-processed data.

10. The system of claim 7, where
the subset of the data is allocated to at least one processing resource of the processing resources, and
the pre-processed data is stored for subsequent near-real-time analysis.

11. The system of claim 10, where the near-real-time analysis is performed based on a request from a client application.

12. The device of claim 8, where
the subset of the data is allocated to at least one processing resource of the processing resources, and
the pre-processed data is stored for subsequent near-real-time analysis.

13. The device of claim 12, where the near-real-time analysis is performed based on a request from a client application.

14. The non-transitory computer-readable medium of claim 9, where
the subset of the data is allocated to at least one processing resource of the processing resources, and
the pre-processed data is stored for subsequent near-real-time analysis.

15. The non-transitory computer-readable medium of claim 14, where the near-real-time analysis is performed based on a request from a client application.

16. The method of claim 1, where the subset of data includes the information associated with the measured radio propagation delay.

17. The method of claim 1, where the geolocation information is based on a signal strength measurement received from a mobile communication unit.

18. The method of claim 1, where the geolocation information is based on a round-trip delay (RTD) measurement for a signal between a mobile communication unit and a base station.

19. The device of claim 8, where the geolocation information is based on a signal strength measurement received from a mobile communication unit.

20. The device of claim 8, where the geolocation information is based on a round-trip delay (RTD) measurements for a signal between a mobile communication unit and a base station.

* * * * *